United States Patent Office 3,299,040
Patented Jan. 17, 1967

3,299,040
DISAZO-DISULFIDE DYES
Charles G. Jeremias, Newberry, S.C., and Frederick E. Barwick III, Mount Holly, N.C., assignors to Martin-Marietta Corporation, a corporation of Maryland
No Drawing. Filed Sept. 6, 1963, Ser. No. 307,014
6 Claims. (Cl. 260—160)

The present invention relates to dyes, and more particularly to azo-disulfide dyes.

The azo-disulfide dyes of the present invention are particularly characterized in that they have the formula

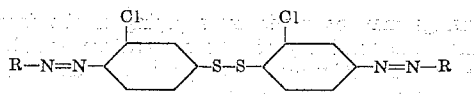

wherein R is the radical of an azoic coupling component.

The method of the present invention is particularly characterized in that azo-disulfide dyes of the above formula may be prepared by tetrazotizing one molecular proportion of 4:4'-diamino-2,2'-dichlorodiphenyldisulfide and coupling the tetrazotized 4:4'-diamino-2,2'-dichlorodiphenyldisulfide with two molecular proportions of an azoic coupling component.

The resulting dyestuffs may be used to dye and print cellulosic fabrics, and it has been found that the presence of the above two chlorine atoms in the dye molecule enhances the light fastness of the dye. Thus, the dyes of the present invention have substantially better light fastness than corresponding dyes which do not have the chlorine atoms. For example, the dye of Example 1 below has substantially better light fastness than the corresponding azo-disulfide dye made by coupling one molecular proportion of tetrazotized 4:4'-diaminodiphenyldisulfide with two molecular proportions of 3-hydroxy-2-naphth-o-anisidide.

The following are suitable and illustrative examples for making the azo-disulfide dyes of the present invention.

Example 1

A solution of tetrazotized 4:4'-diamino-2,2'-dichlorodiphenyldisulfide is prepared as follows. 31.7 gms. (0.1 g.m.w.) of 100% 4:4'-diamino-2,2'-dichlorodiphenyldisulfide are added to 300 ml. water at 45° C., 55 gms. concentrated hydrochloric acid at room temperature are added thereto with stirring, the mixture is heated to 70° C. and stirred until in solution. The resulting solution is cooled to 0° C. and held at that temperature while a slight excess of $NaNO_2$, as shown on KI paper, is added thereto with stirring; about 13.8 gms. (0.2 g.m.w.) of $NaNO_2$ will be thus added.

One molecular proportion of the tetrazotized 4:4'-diamino-2,2'-dichlorodiphenyldisulfide is then coupled with two molecular proportions of 3-hydroxy-2-naphth-o-anisidide as follows. 48.6 gms. (0.2 g.m.w.) of 3-hydroxy-2-naphth-o-anisidide and 8 gms. (0.2 g.m.w.) of NaOH are dissolved in 500 ml. water at 40° C., which is cooled to 0° C. and 8 gms. (0.2 g.m.w.) more of NaOH are added thereto. While maintaining the solution of 3-hydroxy-2-naphth-o-anisidide at 0° C., add thereto gradually over a period of one hour, with stirring, the above solution of tetrazotized 4:4'-diamino-2,2'-dichlorodiphenyldisulfide at 0° C. Stir for three hours at 15° C., recover the resulting solids by filtration at 30° C., wash the solids with water at room temperature until free of inorganics, and dry the resulting product at 80° C. The yield is nearly theoretical.

The resulting dyestuff may be used to dye or print cotton or regenerated cellulosic textile fibers red, and has the following formula

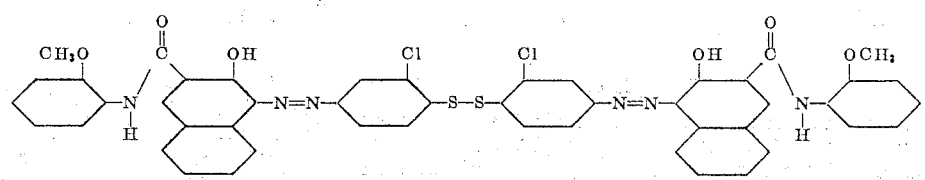

Example 2

This example is the same as Example 1 above, except that 71.5 gms. (0.2 g.m.w.) of 5'-chloro-3-hydroxy-2',4'-dimethoxy-2-naphthanilide are substituted for the 3-hydroxy-2-naphth-o-anisidide used in Example 1 above.

The resulting dyestuff may be used to dye or print cotton or regenerated cellulosic textile fibers red, and has the following formula

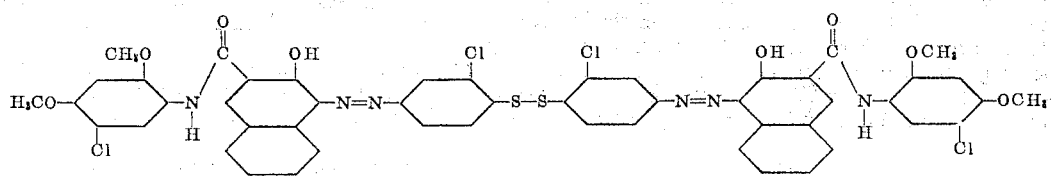

Example 3

This example is the same as Example 1 above, except that 68.3 gms. (0.2 g.m.w.) of 4'-chloro-3-hydroxy-2-naphtho-o-toluidide are substituted for the 3-hydroxy-2-naphth-o-anisidide used in Example 1 above.

The resulting dyestuff may be used to dye or print cotton or regenerated cellulosic textile fabrics red, and has the following formula

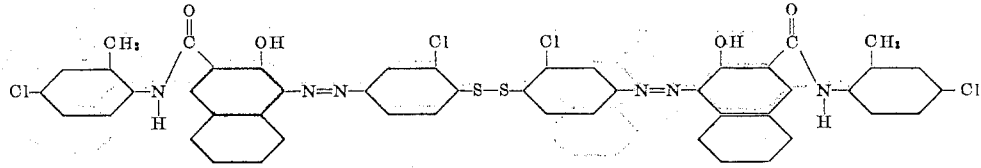

Example 4

This example is the same as Example 1 above, except that 35.8 gms. (0.2 g.m.w.) of 1-phenyl-3-methyl-5-pyrazolone are substituted for the 3-hydroxy-2-naphtho-o-anisidide used in Example 1 above.

The resulting dyestuff may be used to dye or print cotton or regenerated cellulosic textile fibers yellow, and has the following formula

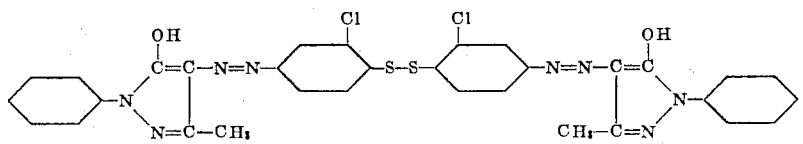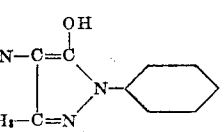

Example 5

This example is the same as Example 1 above, except that 41.4 gms. (0.2 g.m.w.) of acetoacet-ortho-anisidide are substituted for the 3-hydroxy-2-naphth-o-anisidide used in Example 1.

The resulting dyestuff may be used to dye or print cotton or regenerated cellulosic textile fibers bright greenish-yellow, and has the following formula

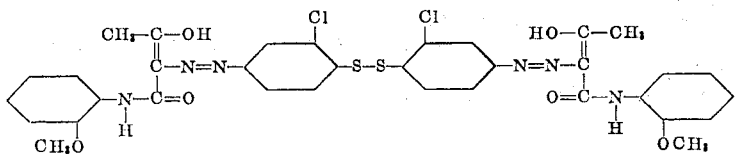

Example 6

This example is the same as Example 1 above, except that 18.6 gms. (0.2 g.m.w.) of 3-methyl-5-pyrazolone are substituted for the 3-hydroxy-2-naphth-o-anisidide used in Example 1.

The resulting dyestuff may be used to dye or print cotton or regenerated cellulosic textile fibers yellow, and has the following formula

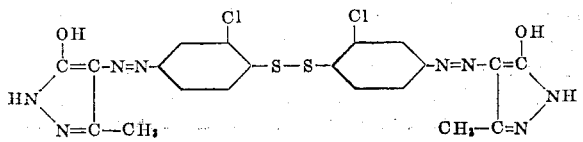

The azo-disulfide dyes of the present invention may be used to dye or print cotton and regenerated cellulose textile fibers by the reduction-oxidation method with outstanding results. For example, dyeings may be made by padding onto cotton fabric an aqueous dispersion of the azo-disulfide dye (2 ozs. dye/gal. water) at 150° F., allowing 85% pick-up based on fabric weight; drying the fabric; padding an aqueous solution of sodium sulfide reducing agent (10 ozs. Na₂S/gal. water) at 150° F. onto the fabric; steaming the fabric with neutral air free steam for 1 min. at 212°–215° F.; washing the fabric with water at 150° F.; passing the fabric through an aqueous solution of oxidizing agent (1 oz. glacial acetic acid and 1 oz. sodium bichromate/gal. water) at 140° F.; rinsing; scouring and drying.

Printings may be made by applying to the fabric a printing paste consisting of 90 ozs. stardi-tragacanth gum thickener, 9 ozs. thiourea reducing agent, 4 ozs. diethylene glycol, 4 ozs. urea, 6 ozs. soda ash, 15 ozs. of a 20% aqueous dispersion of the azo-disulfide dyestuff, and enough water to bring the volume of the printing paste to one gallon; drying the fabric; steaming the fabric with neutral air-free steam for 2–10 mins. to reduce the dyestuff; oxidizing the dye by immersing the fabric for 15 seconds in a bath containing 1.5 ozs. glacial acetic acid and 1 oz. sodium bichromate per gallon of water; rinsing in water; scouring and drying the fabric.

If desired, conventional sulfur dyes may be advantageously dyed or printed in combination with the azo-disulfide dye of the present invention, to obtain various shades not obtainable with either dye alone and to achieve economy, by merely substituting sulfur dye for a portion of the azo-disulfide dye in the above printing pastes or padding compositions.

What is claimed is:

1. An azo dyestuff of the formula

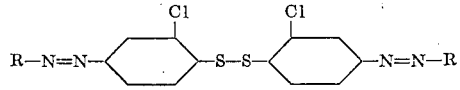

wherein R is the radical of a naphthol, a pyrazolone or acetoacet-ortho-anisidide azoic coupling component, and further characterized in that both R groups are the same.

2. The compound of the formula

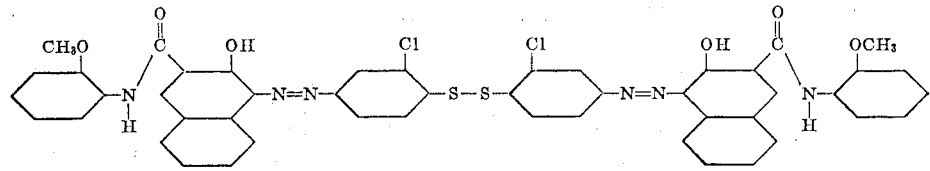

3. The compound of the formula

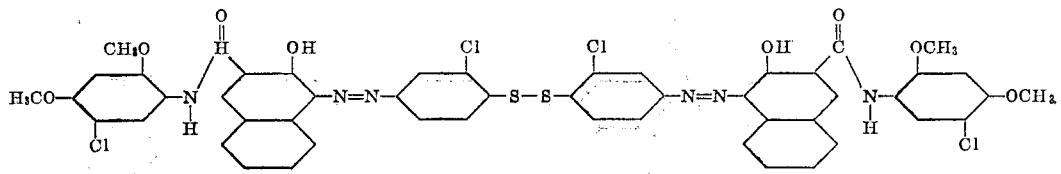

4. The compound of the formula
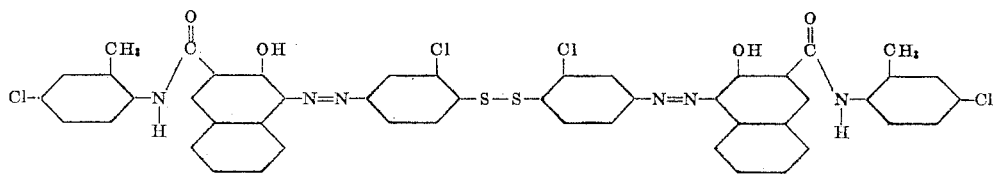
5. The compound of the formula
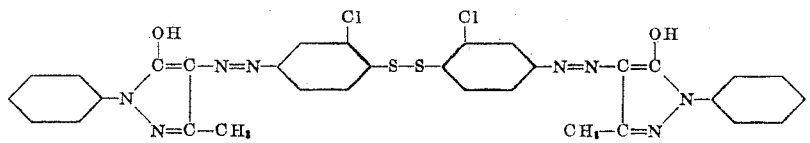
6. The compound of the formula
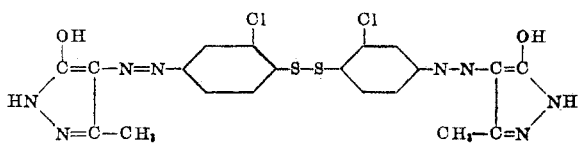
References Cited by the Examiner
UNITED STATES PATENTS
1,973,635 9/1934 Lantz _____ 260—160 X
FOREIGN PATENTS
559,784 3/1944 Great Britain.
CHARLES B. PARKER, *Primary Examiner.*
JOSEPH P. BRUST, *Examiner.*
R. J. FINNEGAN, D. M. PAPUGA,
*Assistant Examiners.*